2,866,825

PRODUCTION OF NON-STAINING ANTIOZONANT

William K. T. Gleim, Island Lake, Peter Urban, Northbrook, and John G. Gatsis, Chicago, Ill., assignors to Universal Oil Products Company, Des Plaines, Ill., a corporation of Delaware No Drawing. Application November 19, 1956
Serial No. 622,800

6 Claims. (Cl. 260—613)

This invention relates to the production of non-staining antiozonant from wood tar distillate.

Wood tar distillate is obtained by the distillation of hardwoods including hickory, oak, beech, walnut, etc. The distillate so obtained is a complex mixture of phenolic and non-phenolic compounds, etc., including pyrogallol and 5-alkyl-pyrogallols, monomethyl ethers of pyrogallol and of 5-alkyl-pyrogallols, dimethyl ethers of pyrogallol and of 5-alkyl-pyrogallols, alkylated guaiacols, neutral oils, etc. Of this complex mixture, it has been found that the dimethyl ethers of 5-alkyl-pyrogallols are effective antiozonants in preventing the cracking of rubber due to ozone and also that these compounds will not discolor light-colored rubber. However, the separation and recovery of the dimethyl ethers of 5-alkyl-pyrogallols from the complex mixture of wood tar distillate is a difficult problem. The present invention provides a novel process by which the dimethyl ethers of 5-alkyl-pyrogallols may be recovered from wood tar distillate.

It has been found that treatment of the settled wood tar distillate with sodium hydroxide under certain critical conditions will permit the separation and recovery of the dimethyl ethers of 5-alkyl-pyrogallols. When using these critical conditions, the sodium salts of the dimethyl ethers of 5-alkyl-pyrogallols are not soluble in the reactant solution. On the other hand, the sodium salts of pyrogallol, the monomethyl ether of pyrogallol or of the guaiacols are soluble in the reactant solution. Furthermore, the neutral oil stratifies as a separate layer. Thus, the dimethyl ethers of 5-alkyl-pyrogallols are separated as an insoluble precipitate from the liquid solutions. The sodium salts of the 5-alkyl-pyrogallols subsequently are sprung with a suitable acid to recover the dimethyl ethers.

It will be noted that the novel process of the present invention separates the dimethyl ethers of 5-alkyl-pyrogallols from the other components of the wood tar distillate. As hereinbefore set forth, these dimethyl ethers are effective non-staining antiozonants but the other components of the wood tar distillate cannot be used for this purpose. Pyrogallol, the monomethyl ether of pyrogallol or the 5-alkylated derivatives of these compounds are either of poor or no potency as antiozonants and also are staining. In other words, if used in light-colored rubber, it will discolor the rubber and would be unsuitable for satisfactory use. The guaiacols or neutral oils do not possess antiozonant properties and, therefore, are unsuitable for such use. The wood tar distillate used for the present process preferably is settled wood tar distillate and has been separated by settling from soluble tars. The soluble tars contain phenolic and monoether compounds and thus preferably are removed prior to treatment of the remaining wood tar distillate in accordance with the present invention.

As hereinbefore set forth, treatment of the wood tar distillate with sodium hydroxide must be effected under certain critical conditions. In the first place, at least one mol of sodium hydroxide must be used per mol of phenolic compound in the wood tar distillate. Preferably from one to two mols of sodium hydroxide per mol of phenolic compound is employed. While three or more mols of sodium hydroxide may be employed, the use of this excess of sodium hydroxide is unnecessary and adds considerably to the cost of the process because subsequent springing with acid requires the use of excessive acid, as well as the additional plant equipment and time entailed in the handling of the excessive materials.

The requirement of one or two mols of sodium hydroxide per mol of phenolic compound prevails regardless of whether the phenolic compound contains one, two, or three hydroxy groups, and the term "phenolic compound" is used in the present specifications and claims to mean mono- and polyhydroxy phenyl compounds and ethers thereof. As hereinbefore set forth, the wood tar distillate also contains neutral oil. The exact composition of the neutral oil has not been definitely determined but it comprises non-phenolic components. Therefore, the proportion of sodium hydroxide to be employed will exclude the neutral oil contained in the wood tar distillate.

It is essential that the treatment with sodium hydroxide be effected in the presence of at least two parts by weight of water per one part by weight of phenolic compound. As will be shown in the examples appended to the present specifications, unless water above the minimum concentration hereinbefore defined is employed, the recovered product will contain the monomethyl ethers of 5-alkyl-pyrogallol to an undesirable extent. As hereinbefore set forth, the presence of the monomethyl ether of pyrogallol or of 5-alkyl-pyrogallols imparts staining properties to the antiozonant and prevents its satisfactory use in light-colored rubber. Furthermore, the use of water in concentrations below the minimum hereinbefore set forth results in a precipitate which is extremely difficult to filter and, therefore, complicates and increases the cost of the recovery process.

It also is essential that treatment with sodium hydroxide be effected at a temperature of above about 15° C. and preferably above about 25° C. and still more preferably above about 65° C. The exact temperature to be employed will depend upon the amount of water present during the treatment, and whether the wide boiling range wood tar distillate or a selected fraction thereof is being treated. In general, the temperature and amount of water is inversely proportional, provided that each one is above the minimum specified hereinbefore.

Treatment of the wood tar distillate with sodium hydroxide may be effected in any suitable manner. As hereinbefore set forth, the wood tar distillate may be utilized as such or it may be separated into a selected fraction, commonly referred to as a heart cut, and then subjected to treatment with sodium hydroxide. The selected fraction preferably boils from about 270° to about 310° C. and still more preferably from about 275° to about 300° C.

When the selected fraction of wood tar distillate is subjected to treatment with sodium hydroxide, the temperature employed may range from 15° C. and preferably from 25° C. to 100° C. In some cases, higher temperatures may be employed when the treatment is effected under superatmospheric pressure. In one method, a dilute sodium hydroxide solution may be prepared, the solution containing from 2% to 10% by weight of sodium hydroxide, and then is intimately mixed with the selected fraction of wood tar distillate. It generally is preferred to heat both the selected fraction of wood tar distillate and the caustic solution prior to commingling the same. Although the reaction is slightly exothermic, provision generally will be required to maintain the desired temperature by supplying heat to the reaction zone. The reaction mixture is stirred or otherwise intimately contacted in order to obtain substantially complete reaction of the sodium hydroxide with the phenolic compounds. When operating at a temperature below about 85° C., the sodium salts of the dimethyl ethers will separate as a precipitate, leaving a solution of caustic soluble phenolic compounds. The precipitate preferably is cooled and then is separated from the other components in any suitable manner. In a preferred method, this separation is effected by a filtering procedure. It is understood that decanting, centrifugal separation or any other suitable method may be employed, either alone or in conjunction with a filtering procedure.

When the wide boiling range wood tar distillate is subjected to treatment with sodium hydroxide, the temperature of treatment preferably is above 90° C. and generally is about 100° C., although higher temperature may be employed when using superatmospheric pressure. In this embodiment, the treatment is effected in a similar manner as hereinbefore described, except that the reaction zone preferably is maintained at a temperature above 90° C., in which case the sodium salts of the dimethyl ethers of 5-alkyl-pyrogallols remain a liquid. However, there is a separation in this zone of two layers, the upper layer comprising the neutral oil. In this method, sodium salts are withdrawn as a liquid and are separated from the neutral oil, either by draining the lower layer or by decanting or otherwise removing the upper layer. After separation from the neutral oil, the liquid is cooled to a temperature below about 85° C., whereby precipitation of the sodium salts of the dimethyl ethers of 5-alkyl-pyrogallol occurs. Conveniently, this mixture is cooled and sent to a settling tank wherein separation of the precipitate occurs. The sodium salts are finally recovered, preferably by filtering or in any other suitable manner as hereinbefore described.

While sodium hydroxide is particularly unique for use in accordance with the present invention, it is understood that with certain modifications other alkali metal hydroxides may be employed. These other alkali metal hydroxides include potassium hydroxide, lithium hydroxide, rubidium hydroxide and cesium hydroxide. In still other cases, the alkaline earth metal hydroxides may be employed including calcium hydroxide, strontium hydroxide and barium hydroxide. It is understood that these various hydroxides are not necessarily equivalent. For example, as hereinbefore set forth, sodium hydroxide appears to be peculiar for this use. This is illustrated in the following examples where the use of one mol of sodium hydroxide per mol of phenolic compound resulted in the desired separation of the dimethyl ethers of 5-alkyl-pyrogallols, whereas the use of one mol of potassium hydroxide resulted in a precipitate which contained 11.9% by weight of the undesired monomethyl ethers. However, the use of two mols of potassium hydroxide resulted in a product containing a lower concentration of the monomethyl ethers. It will be noted that it required twice as much potassium hydroxide as sodium hydroxide and, therefore, it is apparent that the use of sodium hydroxide is particularly preferred.

After separation of the sodium salts of the dimethyl ethers of 5-alkyl-pyrogallols, the dimethyl ethers are recovered by springing the salts with an acid. Any suitable acid may be employed including, for example, hydrochloric acid, sulfuric acid, phosphoric acid, etc. In some cases, organic acids may be employed as, for example, carbonic acid, formic acid, acetic acid, etc. The springing of the salts is readily accomplished and conveniently this is done by mixing the salt in warm water and then adding the acid thereto. The acid will be used in at least stoichiometric amounts in order to form the corresponding sodium salt and to liberate the dimethyl ethers. For example when employing sulfuric acid, sodium sulfate is formed and, when employing hydrochloric acid, sodium chloride is formed, etc. The sodium salts are soluble in water, and particularly water at an elevated temperature and, therefore, are readily separated as an aqueous layer from the oil layer of the dimethyl ethers of 5-alkyl-pyrogallols.

As hereinbefore set forth, the dimethyl ethers of 5-alkyl-pyrogallols are effective antiozonants in rubber and will not discolor light-colored rubber. The dimethyl ethers of 5-alkyl-pyrogallols are illustrated by the following general formula:

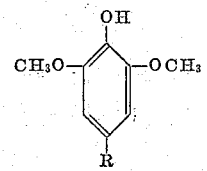

where R is a primary alkyl group. By primary alkyl group we mean an alkyl group in which at least two hydrogen atoms also are attached to the carbon atom of the alkyl group attached to the aryl nucleus. The preferred compounds comprise the dimethyl ether of 5-methyl-pyrogallol, 5-ethyl-pyrogallol and 5-n-propyl-pyrogallol. These compounds appear to be the predominating dimethyl ethers recovered from wood tar distillate. However, it is understood that the diethyl ethers and possibly the dipropyl ethers of such compounds, as well as these ethers or the dimethyl ethers of 5-n-butyl-pyrogallol, 5-isobutyl-pyrogallol, 5-n-amyl-pyrogallol, etc. also may be recovered in the manner herein described.

As hereinbefore set forth, the dimethyl ethers of 5-alkyl-pyrogallols are of especial utility in preventing ozone cracking of white or light-colored rubber. Most of the light-colored rubber now being manufactured commercially is prepared from natural rubber and, therefore, these antiozonants are particularly suitable for use in light-colored natural rubber. However, it is necessary that dark-colored rubber molded with or otherwise adjoining light-colored rubber also must contain a non-staining antiozonant, and the antiozonants recovered by the present invention, therefore, advantageously are utilized in such dark-colored rubber.

Natural rubber generally is regarded as comprising naturally occurring isoprene polymers. The natural rubbers include Hevea rubber, caoutchouc, balata, gutta percha, etc. Although natural rubber appears to have better tear resistance during normal service than synthetic rubber, the natural rubber does undergo ozone cracking and, in unusual service or long periods of service, does fail because of ozone cracking. Furthermore, the presence of cracks in rubber products also is objectionable for aesthetic reasons. Customers and users of rubber products object to the unsightly cracks in the rubber and, therefore, it is important that such cracks be avoided.

While the antiozonant is particularly applicable for use in light-colored natural rubber and the dark-colored rubber associated therewith, it is understood that the antiozonant may be used for the stabilization of other dark-colored natural rubber, as well as for preventing ozone cracking of synthetic rubber. Much of the synthetic rubber now being produced commercially is known in the art as GR–S rubber and is a copolymer of butadiene and styrene. Other synthetic rubbers include those produced from butadiene and acrylonitrile (Buna-N), butadiene and isobutylene (Butyl rubber), etc. Still other synthetic rubbers include Thiokol rubber, silicone rubber, neoprene rubber, etc.

It is understood that the antiozonant can be utilized in any rubber composition subject to ozone cracking, including those used for rubber tires and tubes, hose, belts, sheet and thread rubber, rubberized fabrics, molded goods, boots and shoes, etc., whether vulcanized in a mold, in open steam, in hot air or in the cold by the socalled acid process. Furthermore, it is understood that the antiozonant can be used in reclaims and latices of rubbery materials, whether or not admixed with fillers, pigments, accelerating agents, etc. In another embodiment the antiozonant can be utilized for the stabilization of adhesives, elastomers, etc. which tend to crack due to ozone.

In general, the antiozonant is utilized in a concentration of from about 0.25% to about 10% by weight of the rubber hydrocarbon and preferably in a concentration of from about 2% to about 5% by weight thereof. These concentrations are based on the rubber hydrocarbon, exclusive of the other components of the final rubber composition, and are used in this manner in the present specifications and claims. It is understood that the antiozonant is utilizable along with other additives incorporated in rubber for specific purposes including, for xample, antioxidants, accelerators, softeners, extenders, wax, reinforcing agents, etc.

The antiozonant normally is employed along with certain commercial antioxidants which are incorporated in the latex prior to milling with the other components of the rubber. In this embodiment, the antiozonant thus is used along with a separate antioxidant. Any suitable antioxidant may be employed including, for example, phenyl,beta-naphthylamine, 6-phenyl-2,2,4-trimethyl-1,2-dihydroquinoline, marketed under the trade name of "Santoflex - B," 2,2' - methylene - bis - (4 - methyl - 6 - tert-butyl-p-cresol), the reaction product of acetone and diphenylamine, marketed under the trade name of "B. L. E.," etc. These antioxidants generally are used in a concentration from about 0.5% to about 3% by weight of the rubber.

The antiozonant also normally is employed along with paraffin and/or microcrystalline wax. The wax generally is utilized in a concentration of from about 0.5% to about 3% by weight of the rubber.

In one embodiment, the antiozonant of the present invention is admixed with the antioxidant and/or wax, and the mixture then is composited with one or more of the other components of the rubber composition.

The antiozonant is incorporated in the rubber or rubbery products in any suitable manner and at any suitable stage of preparation. When the antiozonant is added to a liquid, such as rubber pigment or an oil, it is dissolved therein in the desired proportions. When it is to be added to a solid substrate, it is incorporated therein by milling, mastication, etc. The additive may be utilized as such or as a solution or dispersion, or as a powder, paste, etc.

The following examples are introduced to illustrate further the novelty and utility of the present invention but not with the intention of unduly limiting the same.

EXAMPLE I

The data reported in this example were obtained with samples of white natural rubber stock being manufactured by one of the rubber companies and marketed for commercial use. The rubber was cut into strips of 6.00" x 0.50" x 0.075". In the sample containing additive, the additive was incorporated into the rubber sample by immersing and swelling the sample in a solution containing the additive and toluene as a solvent. The concentration of additive was selected to leave in the rubber sample, after the toluene had been removed, a concentration of additive of about 3 parts by weight per 100 parts by weight of rubber hydrocarbon. The rubber sample remained in the solution for about 16 hours and, after this time, the toluene was evaporated by exposing the sample to air at room temperature for two hours, followed by heating for one hour at 195° F. in an air oven. After cooling, the sample was elongated 20% and mounted on a waxed wooden panel, along with the control sample (sample not containing the additive). The samples then were exposed in an ozone cabinet to air containing about 50 parts of ozone per 100 million parts of air at a temperature of about 100° F.

The antiozonant used in this example is the dimethyl ether of 5-propyl-pyrogallol. In a control sample of the rubber (sample not containing the additive), visible cracks appeared in the rubber after 6 hours exposure in the ozone cabinet. On the other hand, a sample of the rubber containing 3 parts by weight of the dimethyl ether of 5-propyl-pyrogallol per 100 parts by weight of rubber hydrocarbon did not show visible cracks until after about 34 hours exposure in the ozone cabinet. Furthermore, both rubber samples were of substantially the same color, thus showing that no discoloration occurred in the sample containing the additive.

From the data in the above example, it will be noted that the dimethyl ether of 5-propyl-pyrogallol served to considerably retard cracking of the rubber due to ozone and also that it did not discolor the rubber.

EXAMPLE II

The antiozonant used in this example is the dimethyl ether of 5-methyl-pyrogallol. This additive was incorporated in another sample of the white natural rubber in a concentration of about 3 parts by weight per 100 parts by weight of rubber hydrocarbon.

A control sample and a sample of the rubber containing the additive (dimethyl ether of 5-methyl-pyrogallol) were exposed to ozone in an ozone cabinet in substantially the same manner as described in Example I except that in this case the ozone concentration was maintained at about 100 parts of ozone per 100 million parts of air. Visible cracks appeared in the control sample (sample not containing the additive) within 5 hours after exposure in the ozone cabinet. On the other hand, visible cracks did not appear in the sample containing the additive until after 24 hours exposure in the ozone cabinet. Furthermore, in the control sample after 8 hours of exposure, the cracks were large, whereas after 48 hours the cracks in the sample containing the additive were only fine cracks. Furthermore, both samples of rubber were of substantially the same color, thus showing that the additive did not discolor the rubber.

From the above data, it will be noted that the antiozonant served to considerably retard cracking of the rubber, as well as keeping the cracks, when they did appear, to a much smaller size. In addition, the additive did not discolor the white rubber.

EXAMPLE III

A commercial settled wood tar distillate was treated in accordance with the present invention. This wood tar distillate had a nominal boiling range of from about 240° C. to about 310° C. It was fractionated to separate a heart cut having a boiling range of from about 275° to about 300° C. and constituting about 40% by volume of the total wood tar distillate. Different portions were subjected to treatment with sodium hydroxide at (1) different ratios of sodium hydroxide to phenolic compound, (2) using different volumes of water, and (3) at different temperatures. These results are reported in the present and following examples.

All of these runs were made by separately heating 200 g. of the selected fraction of wood tar distillate and of sodium hydroxide solutions, the latter being of different concentrations. The heated liquids were commingled in a reaction zone maintained at the desired temperature and were stirred to obtain intimate mixing and complete reaction. The precipitate formed at temperatures below 85° C. was separated by filtration and then was commingled with hot water and sprung by the addition of sulfuric acid. The oil layer then was recovered from the aqueous sodium sulfate layer.

The following runs were made using 0.5 mols, 1 mol and 2 mols of sodium hydroxide per mol of phenolic compound. The results of these runs are reported in the following table:

Table I

| NaOH Mols per Mol of Phenolic Compound | NaOH Insoluble, Grams | Weight percent Monomethyl Ether |
|---|---|---|
| 0.5 | 24 | 8.0 |
| 1 | 84 | 1.7 |
| 2 | 80 | 2.2 |

From the above, it will be noted that the run made using 0.5 mol resulted in a product containing 8% of the monomethyl ether. As hereinbefore set forth, the monomethyl ether of pyrogallol in this concentration imparts sustaining characteristics to the antiozonant and precludes the satisfactory use thereof in light-colored rubber.

EXAMPLE IV

This example illustrates the necessity of using a minimum concentration of water of at least two parts per weight per one part per weight of phenolic compound. The following runs were made in the manner hereinbefore described using one mol of sodium hydroxide per mol of phenolic compound and the concentrations of water shown in the following table:

Table II

| Water, grams | Temperature, °C. | NaOH Insoluble, grams | Weight percent Monomethyl ether |
|---|---|---|---|
| 200 | 90 | 85 | 8 |
| 300 | 90 | 83 | 4 |
| 500 | 65 | 75 | 2 |
| 600 | 65 | 76 | 2 |

From the data in the above table, it will be noted that when using less than two parts of water per part of phenolic compound (less than 400 grams of water per 200 grams of phenolic compound) the products contained excessive concentrations of the monomethyl ether which, as hereinbefore set forth, imparts staining properties to the antiozonant. In general, it is required that the antiozonant contains less than about 2% by weight of monomethyl ether and concentrations above this amount are objectionable.

EXAMPLE V

This example illustrates the effect of temperature in treating the selected fraction of wood tar distillate with sodium hydroxide. These runs were made in the same manner as hereinbefore set forth, using one mol of sodium hydroxide per mol of phenolic compound, 700 grams of water, and the temperatures shown in the following table:

| Temperature, °C. | NaOH Insoluble, grams | Weight percent Monomethyl ether |
|---|---|---|
| 10 | 95 | 9.8 |
| 37 | 76 | 1.9 |
| 65 | 84 | 1.7 |

From the data in the above table, it will be noted that a temperature of 10° C. is too low in order to produce a satisfactory product. Furthermore, the product obtained at this low temperature was very difficult to filter. Therefore, it is necessary that the temperature is greater than 15° C. and preferably greater than 65° C., although satisfactory operation may be obtained at about 35° C. As hereinbefore set forth, when using a lower temperature in the range specified, preferably a higher concentration of water is employed.

EXAMPLE VI

As hereinbefore set forth, sodium hydroxide appears to be unique for use in the present invention. This is illustrated in the present example in which potassium hydroxide and the calcium hydroxide were utilized in place of sodium hydroxide.

When utilizing potassium hydroxide in substantially the same manner as hereinbefore described (200 grams of heart cut, 800 grams of water, 1 mol of potassium hydroxide per mol of phenolic compound and a temperature of 35° C.), the precipitate was an oil and contained 11.9% of the monomethyl ether of a 5-alkyl-pyrogallol.

When utilizing calcium hydroxide under substantially the same conditions as described in the previous paragraph, the precipitate contained 48.2% by weight of the monomethyl ethers of 5-alkyl-pyrogallols. As hereinbefore set forth, these products are unsuitable for use as a non-staining antiozonant.

EXAMPLE VII

As previously mentioned, while sodium hydroxide appears unique, with suitable modifications other alkali metal hydroxides may be used. This is illustrated in the following run where 2 mols of potassium hydroxide per mol of phenolic compound were employed. This run was made in the same manner as the run described in Example VI except that two mols of potassium hydroxide per mol of phenolic compound and 1000 grams of water were employed. The temperature as in the previous runs was 35° C. In this run 56 grams of precipitate was recovered and the precipitate contained 2.2% by weight of the monomethyl ether of 5-alkyl-pyrogallol.

EXAMPLE VIII

This example illustrates the treatment of a commercial wood tar distillate having a nominal boiling range of from about 210° to about 330° C. 400 grams of the wood tar distillate were separately heated to about 100° C. 80 grams of sodium hydroxide were dissolved in 1 liter of water and this solution separately heated to 100° C. This corresponds to approximately 1 mol of sodium hydroxide per mol of phenolic compound in the wood tar distillate. The heated liquids were commingled in a reaction zone maintained at the desired temperature, with constant stirring to obtain intimate mixing and complete reaction. The mixing was discontinued and the reaction mixture was allowed to settle into an upper layer (83 grams) of neutral oil, the settling being accomplished at a temperature of about 100° C. Subsequently, the lower layer was drained from the reaction zone, cooled and allowed to settle in a settling zone at 30° C. The sodium salts of 5-alkyl-pyrogallols precipitated in the settling zone and then were separated from the solution by filtering at ambient temperature. The precipitate was commingled with hot water and a stoichiometric amount of concentrated hydrochloric acid was added thereto. This resulted in springing of the sodium salts and in turn resulted in the formation of two layers, an upper oil layer comprising the dimethoxy ethers of 5-alkyl-pyrogallols and a lower sodium chloride aqueous layer (225 grams). The oil layer comprised the dimethoxy ethers of 5-alkyl-pyrogallols and was recovered in an amount of 56 grams.

We claim as our invention:

1. The method of producing a non-staining antiozonant for rubber which comprises treating settled hardwood tar distillate at a temperature of from at least 25° C. to about 100° C. with an alkali metal hydroxide selected from the group consisting of sodium and potassium hydroxides in a proportion of from at least 1 mol to about 3 mols of alkali metal hydroxide per mol of phenolic compound in said wood tar distillate when said hydroxide is sodium hydroxide and at least 2 mols to about 3 mols of hydroxide per mol of phenolic compound in the wood tar distillate when the hydroxide is potassium hydroxide, in the presence of at least 2 parts by weight of water per part by weight of phenolic compound, adjusting the temperature to below about 85° C. to precipitate the alkali metal salt of the dimethyl ethers of 5-alkyl-pyrogallols, separating the resultant precipitate from the other components of the wood tar distillate, and subsequently springing the salt to recover the dimethyl ethers of 5-alkyl-pyrogallols as said non-staining antiozonant.

2. The method of producing a non-staining antiozonant for rubber which comprises treating settled hardwood tar distillate at a temperature of from at least 25° C. to about 100° C. with sodium hydroxide in a proportion of from at least 1 mol to about 3 mols of sodium hydroxide per mol of phenolic compound in said wood tar distillate, in the presence of at least 2 parts by weight of water per part by weight of phenolic compound, adjusting the temperature to below about 85° C. to precipitate the sodium salt of the dimethyl ethers of 5-alkyl-pyrogallols, separating the resultant precipitate from the other components of the wood tar distillate, and subsequently springing the salt to recover the dimethyl ethers of 5-alkyl-pyrogallols as said non-staining antiozonant.

3. The method of producing a non-staining antiozonant for rubber from settled hardwood tar distillate which comprises fractionating said wood tar distillate to separate a selected fraction boiling from about 275° to about 300° C., treating said selected fraction at a temperature of from about 25° C. to about 100° C. with sodium hydroxide in a proportion of from at least 1 mol to about 3 mols of sodium hydroxide per mol of phenolic compound in said selected fraction, in the presence of at least 2 parts by weight of water per part by weight of phenolic compound, adjusting the temperature to below about 85° C. and thereby separating a precipitate comprising the sodium salt of the dimethyl ethers of 5-alkyl-pyrogallols from the other components of the selected fraction, and subsequently springing the salt to recover the dimethyl ethers of 5-alkyl-pyrogallols as said non-staining antiozonant.

4. The method of producing a non-staining antiozonant for rubber which comprises treating settled hardwood tar distillate at a temperature of from about 90° C. to about 100° C. with sodium hydroxide in a proportion of at least 1 mol to about 3 mols of sodium hydroxide per mol of phenolic compound in said wood tar distillate, in the presence of at least 2 parts by weight of water per part by weight of phenolic compound, settling the reaction mixture at a temperature above about 90° C. to separate an upper layer of neutral oil and a lower layer comprising salts of phenolic compounds, cooling said lower layer to a temperature below about 85° C. and thereby forming a precipitate comprising the sodium salts of the dimethyl ethers of 5-alkyl-pyrogallols, separating said precipitate from the other components, and springing the former with an acid to form the dimethyl ethers of 5-alkyl-pyrogallols as said non-staining antiozonant.

5. The process which comprises treating settled hardwood tar distillate at a temperature of from about 90° C. to about 100° C. with sodium hydroxide in a proportion of from at least 1 mol to about 3 mols of sodium hydroxide per mol of phenolic compound in said wood tar distillate, in the presence of at least 2 parts by weight of water per part by weight of phenolic compound, settling the reaction mixture at a temperature above about 90° C. to form an upper layer of neutral oil and a lower layer comprising salts of phenolic compounds, separating said lower layer from the neutral oils and cooling said lower layer to a temperature below about 85° C., whereby sodium salts of dialkyl ethers of 5-alkyl-pyrogallols precipitate, recovering said precipitate and springing the same with an acid to form the dialkyl ethers of 5-alkyl-pyrogallols, and separately recovering the same from the other components of the wood tar distillate.

6. The process which comprises fractionating settled hardwood tar distillate to separate a selected fraction boiling from about 270° to about 310° C., treating said selected fraction at a temperature of from about 25° C. to about 100° C. with sodium hydroxide in a proportion of from at least 1 mol to about 3 mols of sodium hydroxide per mole of phenolic compound in said wood tar distillate, in the presence of at least 2 parts by weight of water per part by weight of phenolic compound, adjusting the temperature to below about 85° C. and thereby separating from the other components of the selected fraction a precipitate comprising the sodium salts of dialkyl ethers of alkyl-pyrogallols, springing said precipitate with acid to form the dialkyl ethers of 5-alkyl-pyrogallols and separately recovering the latter from the other components of the reaction mixture.

References Cited in the file of this patent

UNITED STATES PATENTS 1,651,617    Moser _____ Dec. 6, 1927

OTHER REFERENCES

Hunter et al.: Jour. Amer. Chem. Soc., vol. 61 (1939), pp. 2190–2194.

Stillson et al: Jour. Amer. Chem. Soc., vol. 67 (1945), pp. 303–307.